Aug. 7, 1928. 1,680,214
G. FEATHER
ELECTRICALLY DRIVEN RADIAL DRILL
Filed Feb. 17, 1926
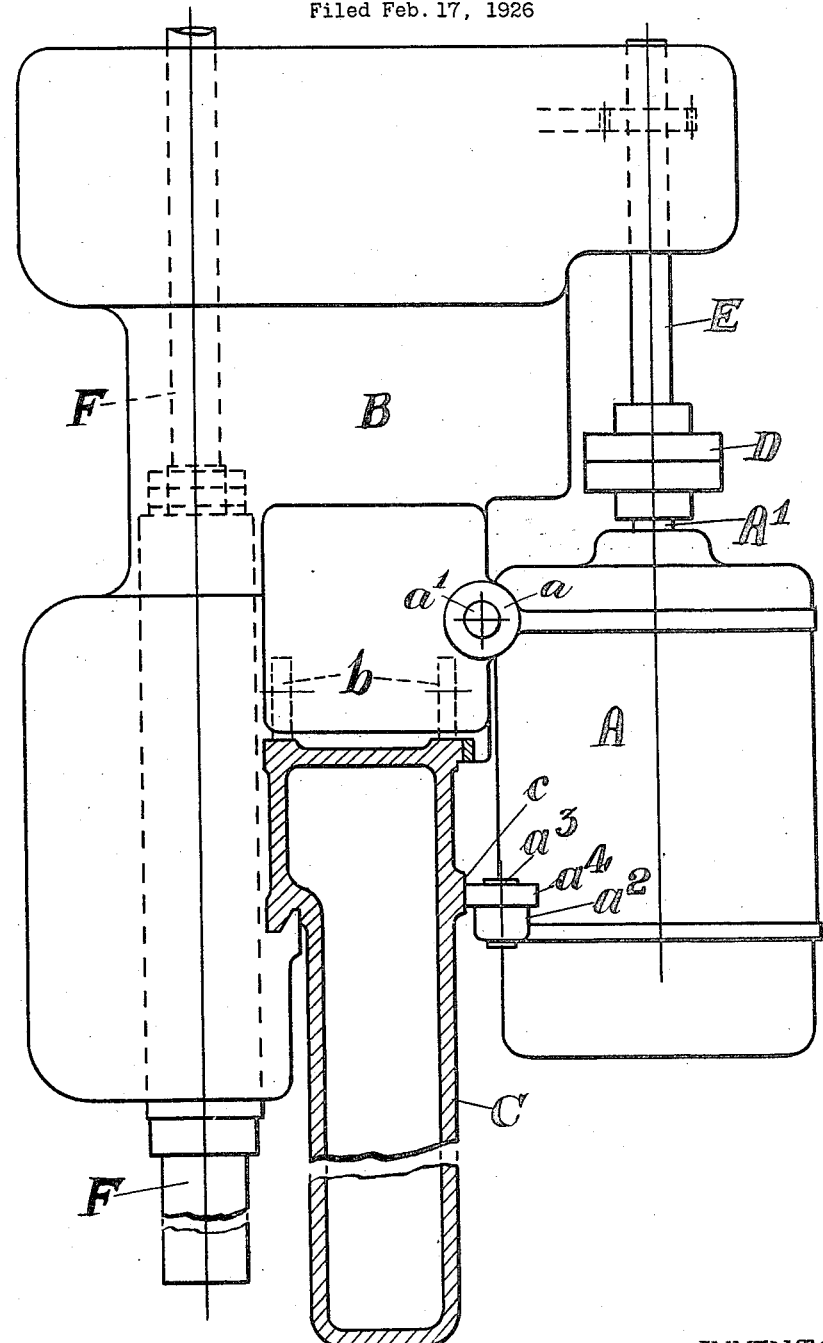
INVENTOR:
George Feather
by Monroe C. Miller Atty Patented Aug. 7, 1928.

1,680,214

UNITED STATES PATENT OFFICE.

GEORGE FEATHER, OF HALIFAX, ENGLAND, ASSIGNOR TO WILLIAM ASQUITH LIMITED, OF HALIFAX, ENGLAND.

ELECTRICALLY-DRIVEN RADIAL DRILL.

Application filed February 17, 1926, Serial No. 88,879, and in Great Britain February 24, 1925.

This invention relates to electrically driven radial drills and has for its chief object to introduce an improved method of mounting the electric motors thereon which will reduce the cost of machining, simplify the erecting and taking down of the motor and enable it to be brought into alignment with the driven shaft without the necessity for any very accurate fitting. The invention is primarily intended for use in connection with a radial drill in which the weight of the carriage is largely disposed in a central position above the top of the arm and it consists in hinging the motor to the carriage and providing it with one or more rollers adapted to run in contact with a guiding surface on the radial arm, the drive being transmitted from the motor shaft through the intervention of a coupling to a shaft which drives the drill spindle.

In order that the said invention may be clearly understood and readily carried into effect, the same is described more fully with reference to the accompanying drawing, which shows part of a radial drill with a motor mounted and supported in accordance with this invention.

The upper portion of the motor casing A is formed at one side with one or more lugs $a$ for the reception of a hinge rod or shaft $a^1$ which passes horizontally through these lugs and through two lugs on the back of the carriage B. The lower portion of the motor casing is provided with one or more lugs $a^2$ each carrying a vertically arranged stud $a^3$ on which is mounted a roller $a^4$ which is adapted to run on a machined surface $c$ on the back of the raidal arm C. The motor shaft $A^1$ projects from the upper end of the motor casing and is connected by a coupling D which may be flexible or otherwise with a vertical shaft E which transmits motion to the drill spindle F through any appropriate form of gearing. The carriage B is supported mainly by rollers $b$ which run on bearing surfaces on the top of the arm C.

With the present arrangement the vertical drill spindle F is located at one side of the horizontal arm C and the electric motor is located at the opposite side of the arm with its armature shaft disposed substantially vertically, the hinge connection of the motor casing with the carriage, and the flexible coupling D, permitting the motor to swing downwardly in a vertical plane against the guide on the arm.

What I claim as my invention and desire to secure by Letters Patent in the United States is:—

1. In a radial drill, a horizontal arm, a carriage movable thereon, a drill spindle mounted in said cariage at one side of said arm, an electric motor at the opposite side of said arm hinged to said carriage to swing downwardly by gravity toward said arm, the arm having a guiding surface and the motor having a portion movable along said surface, and an operative connection between said motor and spindle.

2. In a radial drill, a horizontal arm, a carriage movable thereon, a drill spindle mounted in said carriage at one side of said arm, an electric motor at the opposite side of said arm hinged to the carriage and arranged to swing downwardly by gravity toward said arm, the arm having a guiding surface and the motor having a portion to contact with and move along said surface, and an operative connection between said motor and spindle and including a flexible coupling adjacent to the motor to permit the motor to swing slightly relatively to said carriage and arm.

3. In a radial drill, a horizontal arm, a carriage movable thereon, a drill spindle mounted in the carriage at one side of said arm, an electric motor at the opposite side of said arm hinged to said carriage to swing downwardly toward said arm, said motor having a substantially vertical shaft, said arm having a guiding surface, the motor having a portion to bear against and move along said surface, and an operative connection between said shaft and spindle.

4. In a radial drill, a horizontal arm, a carriage movable thereon, a drill spindle mounted in the carriage at one side of said arm, an electric motor at the opposite side of said arm hinged to said carriage to swing downwardly toward said arm, said motor having a substantially vertical shaft, said arm having a guiding surface, the motor having a portion to bear against and move along said surface, and an operative connection between sid shaft and spindle including a flexible coupling immediately above the motor.

In testimony whereof I affix my signature.

G. FEATHER.